United States Patent
Tsuda

[11] Patent Number: 6,088,197
[45] Date of Patent: Jul. 11, 2000

[54] THIN FILM MAGNETIC HEAD WITH REDUCED-AREA COMMON POLE LAYER FOR IMPROVING RECORDING DENSITY

[75] Inventor: Tadaaki Tsuda, Ibaragi, Japan

[73] Assignee: NEC Corporation, Tokyo, Japan

[21] Appl. No.: 09/124,072

[22] Filed: Jul. 29, 1998

[30] Foreign Application Priority Data

Jul. 30, 1997  [JP]  Japan ................................. 9-204888

[51] Int. Cl.[7] ............................... G11B 5/39; G11B 5/147
[52] U.S. Cl. ............................................ 360/113; 360/126
[58] Field of Search ..................................... 360/113, 126

[56] References Cited

U.S. PATENT DOCUMENTS 5,901,431   5/1999   Alberto ................................. 360/126

*Primary Examiner*—A. J. Heinz
*Attorney, Agent, or Firm*—Whitham, Curtis & Whitham

[57] ABSTRACT

In a thin film magnetic head including a substrate, a lower shield layer formed on the substrate, a first non-magnetic layer formed on the lower shield layer, a common magnetic pole formed on the first non-magnetic layer to be operable as both an upper shield layer and a lower magnetic pole, a second non-magnetic layer formed on the common magnetic pole, a conductive coil which is formed on the second non-magnetic layer through a first-insulation layer and which is overlaid by a second insulation layer, and an upper magnetic pole formed on the second insulation layer, a front end of the upper magnetic pole is directly kept in contact with the first non-magnetic layer while a rear end of the upper magnetic pole is directly kept in contact with the common magnetic pole. An element of magnetoresistance effect is provided in a front end of the first non-magnetic layer. An area (e.g., width); and of the common magnetic pole is not larger than an area (e.g., width) of the upper magnetic pole.

8 Claims, 6 Drawing Sheets

THIN FILM MAGNETIC HEAD WITH REDUCED-AREA COMMON POLE LAYER FOR IMPROVING RECORDING DENSITY

BACKGROUND OF THE INVENTION

The present invention relates to a thin film magnetic head which is mounted on a magnetic disk unit for use in recording and reproducing information, and more particularly to a compound type thin film magnetic head having an element of magnetoresistance effect (MR thin film magnetic head).

A conventional compound type thin film magnetic head comprises a substrate made of a non-magnetic material, a lower shield layer of a magnetic material formed on the substrate, a first non-magnetic layer formed on the lower shield layer, a common magnetic pole of a magnetic material formed on the first non-magnetic layer, a second non-magnetic layer formed on the common magnetic pole, a conductive coil formed on the second non-magnetic layer through a first insulation layer, a second insulation layer overlaid on the conductive coil, and an upper magnetic pole of a magnetic material formed on the second insulation layer. A front end of the upper magnetic pole is directly kept in contact with the first non-magnetic layer while a rear end of the upper magnetic pole is directly kept in contact with the common magnetic pole. Accordingly, a yoke structure is formed by the upper magnetic pole and the common magnetic pole. The conventional compound type thin film magnetic head further comprises an element of magnetoresistance effect in a front end of the first non-magnetic layer. The common magnetic pole is operable as both an upper shield layer and a lower magnetic pole. The element of magnetoresistance effect is therefore magnetically isolated with the lower shield layer and the common magnetic pole by the first non-magnetic layer. On the other hand, the conductive coil is therefore electrically isolated with the common magnetic pole and the upper magnetic pole by the first insulation layer and the second insulation layer.

In a recent hard disk drive, an NLTS compensation circuit has been used for compensating a non-linear bit shift (NLTS) and thereby reducing mutual interference between adjacent bits in order to achieve a large recording density. However, it comes to the limits inevitably that the non-linear bit shift (NLTS) is compensated by the NLTS compensation circuit.

On the other hand, an increase or a decrease of the above-mentioned non-linear bit shift (NLTS) depends upon an inductance of a recording portion in an MR thin film magnetic head. In the conventional compound type thin film magnetic head, the common magnetic pole has a considerably wide area, compared with the upper magnetic pole. As a result, the inductance of a recording portion therein has a large value, so that the non-linear bit shift (NLTS) inevitably becomes large. Accordingly, the conventional compound type thin film magnetic head has already reached a region exceeding the aforesaid limits to which the non-linear bit shift (NLTS) is compensated by the NLTS compensation circuit. This causes a problem that a recording density of a hard disk drive is prevented from being improved.

SUMMARY OF THE INVENTION

It is therefore an object of the present invention to provide a compound type thin film magnetic head capable of reducing the NLTS to improve a recording density of a hard disk drive by decreasing an inductance of a recording portion thereof without deteriorating an electrical characteristic, such as an output power for reading an information.

Other objects of the present invention will become clear as the description proceeds.

According to an aspect of the present invention, there is provided a thin film magnetic head which is mounted on a magnetic disk unit for use in recording and reproducing information, comprising: a substrate which is made of a non-magnetic material; a lower shield layer which is formed on the substrate and which is made of a magnetic material; a first non-magnetic layer which is formed on the lower shield layer; a common magnetic pole which is formed on the first non-magnetic layer and which is operable as both an upper shield layer and a lower magnetic pole; the common magnetic pole having a first width; a second non-magnetic layer which is formed on the common magnetic pole; a conductive coil which is formed on the second non-magnetic layer with a first insulation layer interposed therebetween; the conductive coil being overlaid by a second insulation layer; an upper magnetic pole which is formed on the second insulation layer and which has a second width; a yoke structure which is formed by the upper magnetic pole and the common magnetic pole; a front end of the upper magnetic pole being directly kept in contact with the first non-magnetic layer while a rear end of the upper magnetic pole being directly kept in contact with the common magnetic pole; an element of magnetoresistance effect which is provided in a front end of the first non-magnetic layer; and the first width of the common magnetic pole being not larger than the second width of the upper magnetic pole.

An area of the common magnetic pole may be not larger than about 3000 $\mu m^2$.

The conductive coil may comprise a single layer.

The conductive coil may have a multi-layer structure which includes at least two layers, wherein adjacent layers thereof being isolated with each other by an insulation layer.

According to another aspect of the present invention, there is provided a thin film magnetic head which is mounted on a magnetic disk unit for use in recording and reproducing information, comprising: a substrate which is made of a non-magnetic material; a lower shield layer which is formed on the substrate and which is made of a magnetic material; a first non-magnetic layer which is formed on the lower shield layer; a common magnetic pole which is formed on the first non-magnetic layer and which is operable as both an upper shield layer and a lower magnetic pole; the common magnetic pole having a first width; a second non-magnetic layer which is formed on the common magnetic pole; a conductive coil which is formed on the second non-magnetic layer with a first insulation layer interposed therebetween; the conductive coil being overlaid by a second insulation layer; an upper magnetic pole which is formed on the second insulation layer and which has a second width; a yoke structure which is formed by the upper magnetic pole and the common magnetic pole; a front end of the upper magnetic pole being directly kept in contact with the first non-magnetic layer while a rear end of the upper magnetic pole being directly kept in contact with the common magnetic pole; an element of magnetoresistance effect which is provided in a front end of the first non-magnetic layer; the common magnetic pole consisting of a front end portion corresponding to the element of magnetoresistance effect and a main portion except for the front end portion; the first width of the common magnetic pole consisting of a primary width of the main portion and a secondary width of the front end portion; the primary width of the main portion being not larger than the second width of the upper magnetic pole; and the secondary width of the front end portion being larger than the primary width of the main portion.

An area of the common magnetic pole may be not larger than about 8000 $\mu m^2$.

The conductive coil may comprise a single layer.

The conductive coil may have a multi-layer structure which includes at least two layers, wherein adjacent layers thereof being isolated with each other by an insulation layer.

DESCRIPTION OF THE PREFERRED EMBODIMENTS

Figure 1:
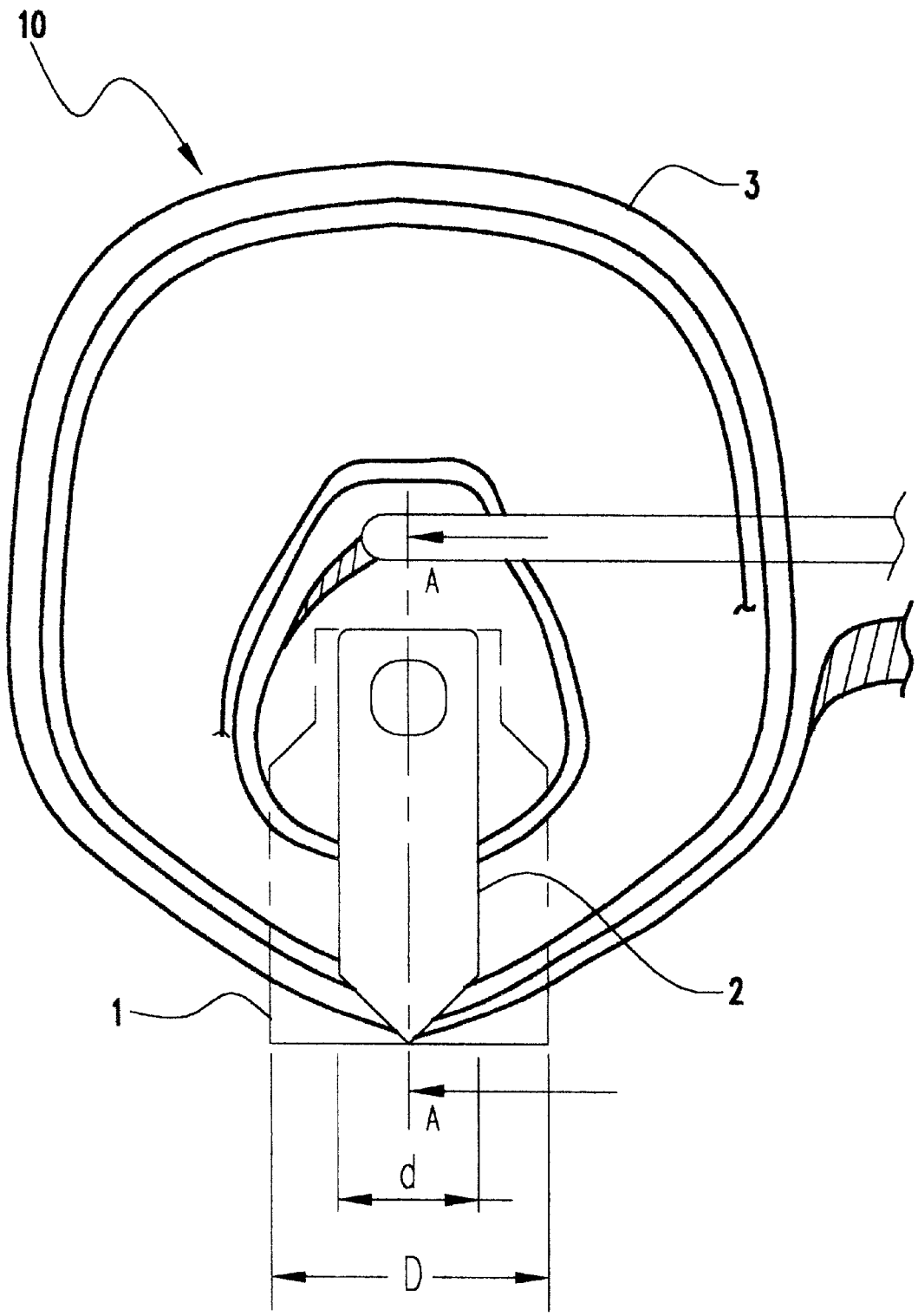
FIG. 1 is a schematic plan view for showing an example of a conventional compound type thin film magnetic head.
Figure 2:
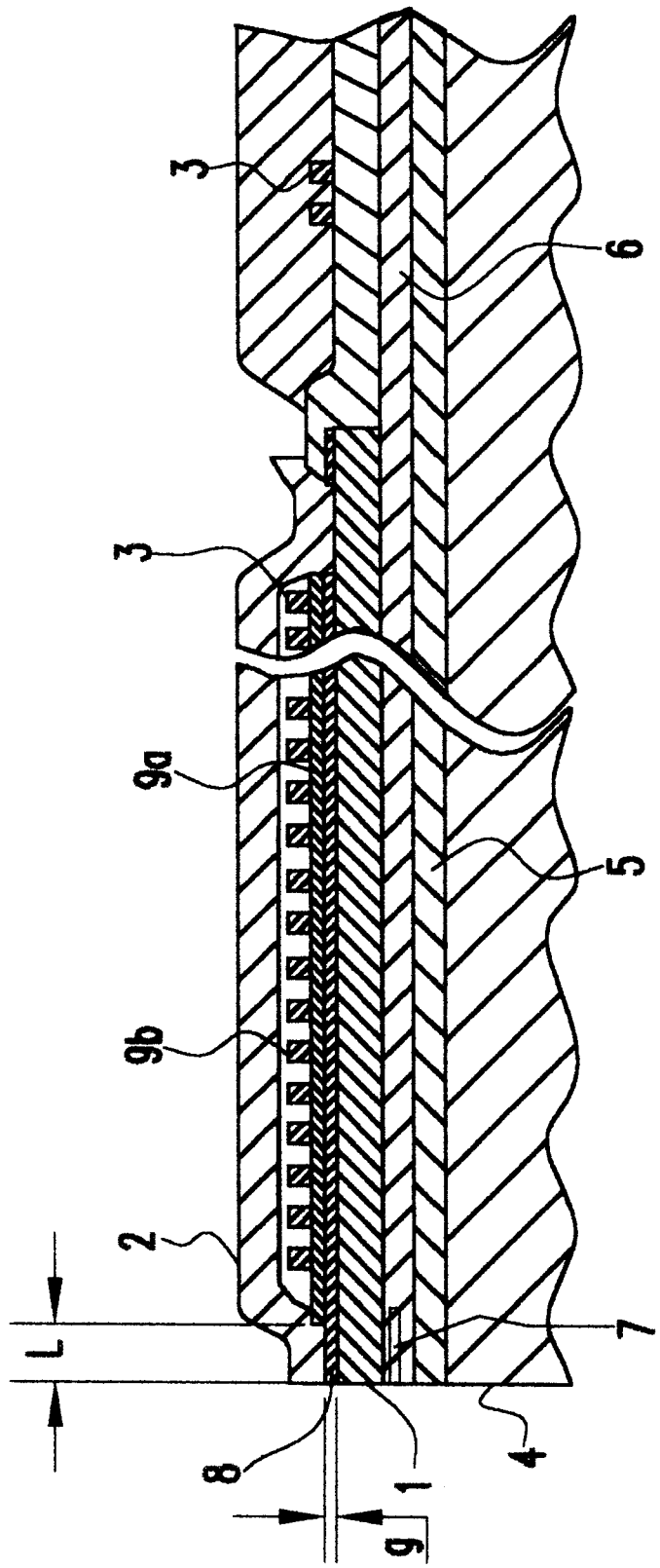
FIG. 2 is a schematic sectional view of the conventional compound type thin film magnetic head taken across a line A—A illustrated in FIG. 1.

Referring to FIGS. 1 and 2, description is, at first made about a conventional compound type thin film magnetic head in order to facilitate an understanding of the present invention.

FIG. 1 is a schematic plan view for showing an example of a conventional compound type thin film magnetic head. FIG. 2 is a schematic sectional view of the conventional compound type thin film magnetic head taken across a line A—A illustrated in FIG. 1.

In FIGS. 1 and 2, illustrated is a conventional compound type thin film magnetic head which is mounted on a magnetic disk unit (hard disk unit: hard disk drive) for use in recording and reproducing information and which has an element of magnetoresistance effect (MR thin film magnetic head). As illustrated in FIGS. 1 and 2, the conventional compound type thin film magnetic head 10 comprises a substrate 4 which is made of a non-magnetic material, such as aluminum oxide-titanium carbon ($Al_2O_3$—TiC) and the like, a lower shield layer 5 which is formed on the substrate 4 and which is made of a magnetic material, such as a permalloy (NiFe), an amorphous magnetic alloy, and the like, a first non-magnetic layer 6 which is formed on the lower shield layer 5 and which is made of a non-magnetic material, such as an alumina ($Al_2O_3$), and the like, a common magnetic pole 1 which is formed on the first non-magnetic layer 6 and which is made of a magnetic material, such as a permalloy (NiFe), and the like, a second non-magnetic layer 8 which is formed on the common magnetic pole 1 and which is made of a non-magnetic material, such as an alumina ($Al_2O_3$), and the like, a conductive coil 3 which is made of a copper wire which is formed on the second non-magnetic layer 8 through a first insulation layer 9a made of an insulating material, such as a photo resist, or the like, a second insulation layer 9b which is overlaid on the conductive coil 3 and which is made of an insulating material, such as a photo resist, or the like, and an upper magnetic pole 2 which is formed on the second insulation layer 9b and which is made of a magnetic material, such as a permalloy (NiFe), and the like. A front end of the upper magnetic pole 2 is directly kept in contact with the first non-magnetic layer 6 while a rear end of the upper magnetic pole 2 is directly kept in contact with the common magnetic pole 1. Accordingly, a yoke structure is formed by the upper magnetic pole 2 and the common magnetic pole 1. The conventional compound type thin film magnetic head 10 further comprises an element 7 of magnetoresistance effect in a front end of the first non-magnetic layer 6. In the example being illustrated, the common magnetic pole 1 is operable as both an upper shield layer and a lower magnetic pole.

The element 7 of magnetoresistance effect is therefore magnetically isolated with the lower shield layer 5 and the common magnetic pole 1 by the first non-magnetic layer 6. On the other hand, the conductive coil 3 is therefore electrically isolated with the common magnetic pole 1 and the upper magnetic pole 2 by the first insulation layer 9a and the second insulation layer 9b.

As illustrated in FIG. 1, the common magnetic pole 1 has a considerably wide area, compared with the upper magnetic pole 2. This will be readily understood from FIG. 1 in which a width D of the front end of the common magnetic pole 1 directed downward of FIG. 1 is depicted to be considerably larger than a width d of the upper magnetic pole 2.

In a recent hard disk drive, an NLTS compensation circuit has been used for compensating a non-linear bit shift (NLTS) and thereby reducing mutual interference caused between adjacent bits in order to achieve a large recording density. However, it comes to the limits inevitably that the non-linear bit shift (NLTS) is compensated by the NLTS compensation circuit.

On the other hand, an increase or a decrease of the above-mentioned non-linear bit shift (NLTS) depends upon an inductance of a recording portion in an MR thin film magnetic head. In the conventional compound type thin film magnetic head illustrated in FIGS. 1 and 2, the common magnetic pole 1 has a considerably wide area, compared with the upper magnetic pole 2, as mentioned before. As a result, the inductance of a recording portion therein has a large value, so that the non-linear bit shift (NLTS) inevitably becomes large. Accordingly, the conventional compound type thin film magnetic head has already reached a region exceeding the aforesaid limits to which the non-linear bit shift (NLTS) is compensated by the NLTS compensation circuit. As previously mentioned, this causes a problem that a recording density of a hard disk drive is prevented from being improved.

Figure 3A:
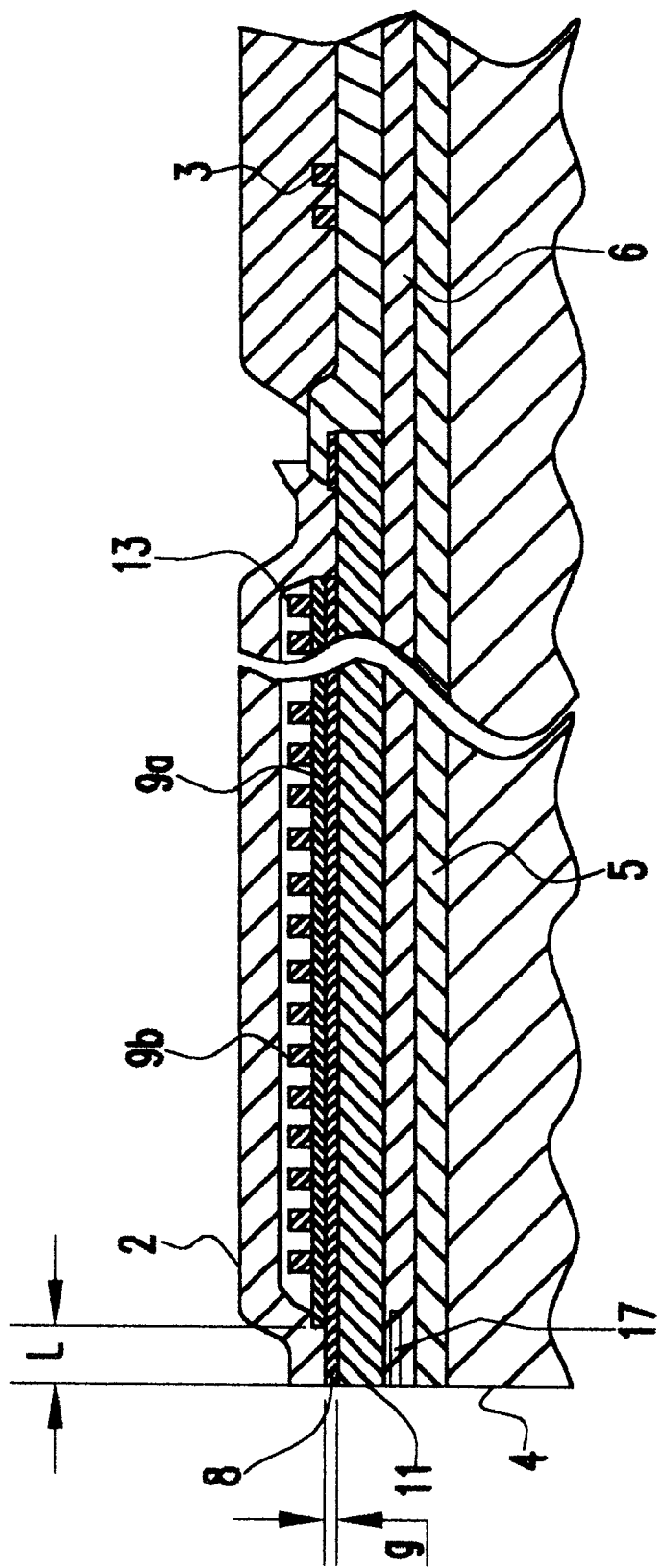
FIG. 3A is a schematic cross-sectional view of a compound type thin film magnetic head according to a first embodiment of the present invention.
Figure 3B:
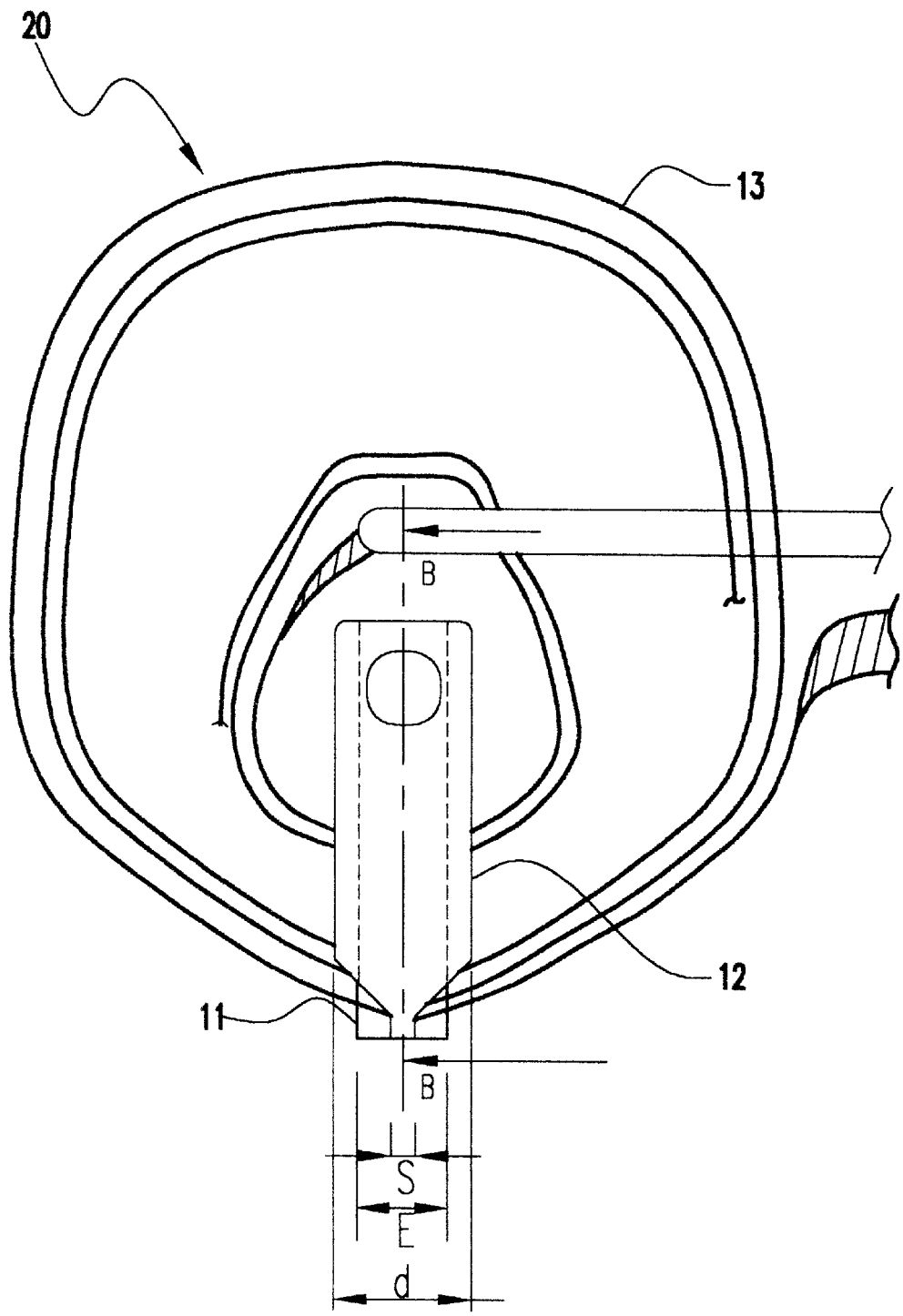
FIG. 3B is a schematic plan view for showing the compound type thin film magnetic head according to a first embodiment of the present invention.
Figure 4:
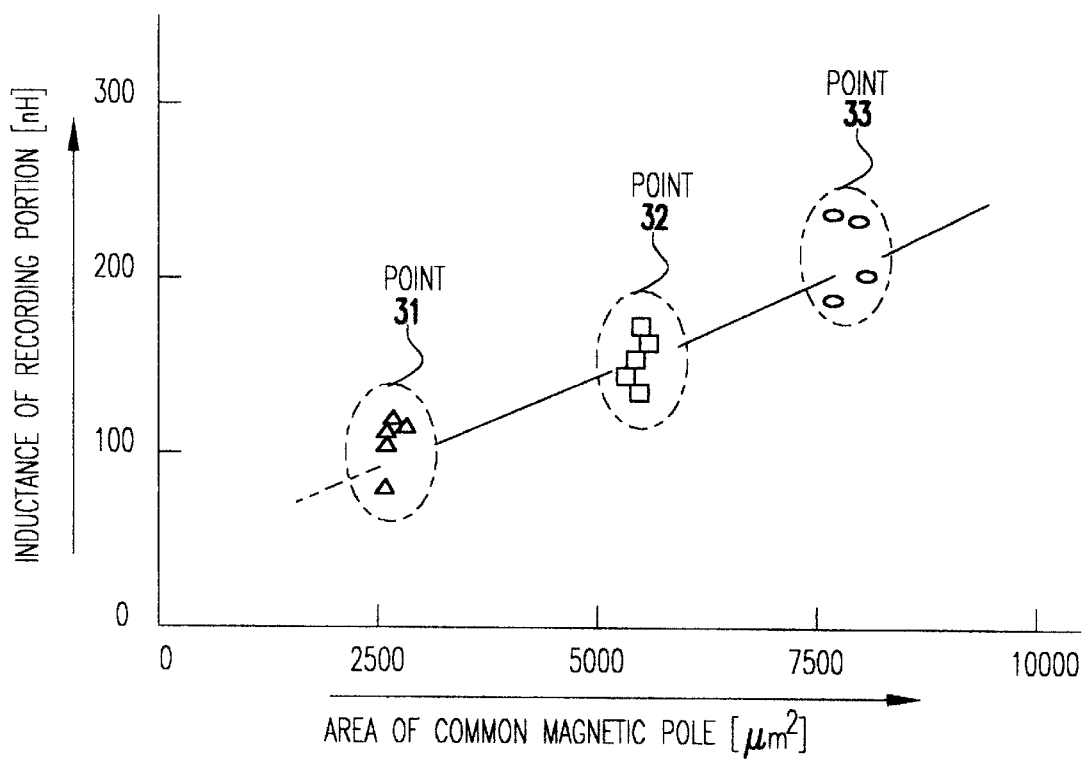
FIG. 4 is a characteristic diagram for showing a relation between an area of a common magnetic pole and an inductance of a recording portion in the compound type thin film magnetic head illustrated in FIG. 3.
Figure 5:
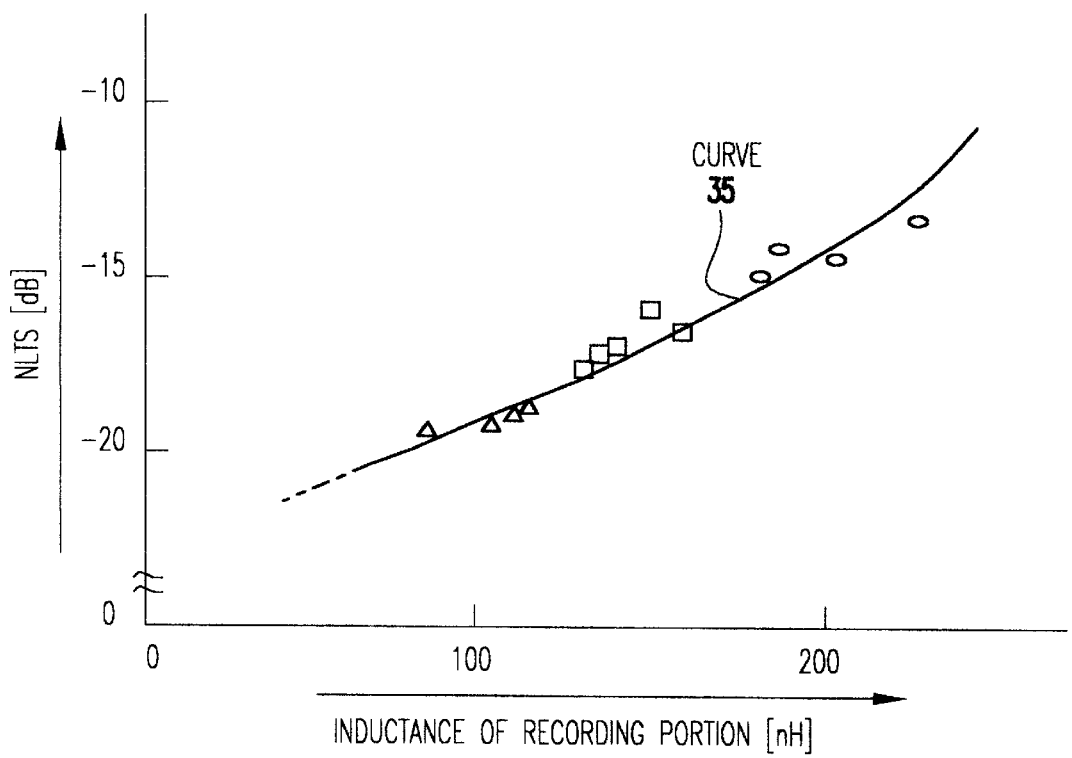
FIG. 5 is a characteristic diagram for showing a relation between an inductance of a recording portion and an NLTS in the compound type thin film magnetic head illustrated in FIG. 3.

Referring now to FIGS. 3 through 5, description will proceed to a compound type thin film magnetic head according to a first embodiment of the present invention.

FIG. 3 is a schematic plan view for showing the compound type thin film magnetic head according to a first embodiment of the present invention. FIG. 4 is a characteristic diagram for showing a relation between an area of a common magnetic pole and an inductance of a recording portion in the compound type thin film magnetic head illustrated in FIG. 3. FIG. 5 is a characteristic diagram for showing a relation between an inductance of a recording portion and an NLTS in the compound type thin film magnetic head illustrated in FIG. 3.

In FIGS. 3A and 3B, illustrated is a compound type thin film magnetic head 20 according to the first embodiment of the present invention. The compound type thin film magnetic head 20 has a structure basically similar to that of the conventional compound type thin film magnetic head 10 illustrated in FIG. 1, as understood from a cross-section thereof illustrated in FIG. 3B. The compound type thin film magnetic head 20 is also mounted on a magnetic disk unit (hard disk unit: hard disk drive) for use in recording and reproducing information and which has an element of magnetoresistance effect (MR thin film magnetic head). Similar portions are designated by like reference numerals.

As illustrated in FIGS. 3A and 3B, the compound type thin film magnetic head 20 also includes a substrate 4 which is made of a non-magnetic material, such as aluminum oxide-titanium carbon ($Al_2O_3$—TiC) and the like, a lower shield layer 5 which is formed on the substrate 4 and which is made of a magnetic material, such as a permalloy (NiFe), an amorphous magnetic alloy, and the like, a first non-magnetic layer 6 which is formed on the lower shield layer 5 and which is made of a non-magnetic material, such as an alumina ($Al_2O_3$), and the like.

The compound type thin film magnetic head 20 further comprises a common magnetic pole 11 which is formed on the first non-magnetic layer 6 and which is made of a magnetic material, such as a permalloy (NiFe), and the like, a second non-magnetic layer 8 which is formed on the common magnetic pole 11 and which is made of a non-magnetic material, such as an alumina ($Al_2O_3$), and the like, a conductive coil 13 which is made of a copper wire which is formed on the second non-magnetic layer 8 through a first insulation layer 9a made of an insulating material, such as a photo resist, or the like, a second insulation layer 9b which is overlaid on the conductive coil 13 and which is made of an insulating material, such as a photo resist, or the like, and an upper magnetic pole 12 which is formed on the second insulation layer 9b and which is made of a magnetic material, such as a permalloy (NiFe), and the like. A front end of the upper magnetic pole 12 is directly kept in contact with the first non-magnetic layer 6 while a rear end of the upper magnetic pole 12 is directly kept in contact with the common magnetic pole 11. Accordingly, a yoke structure is formed by the upper magnetic pole 12 and the common magnetic pole 11. The compound type thin film magnetic head 20 further comprises an element 17 of magnetoresistance effect in a front end of the first non-magnetic layer 6. In the example being illustrated, the common magnetic pole 11 is operable as both an upper shield layer and a lower magnetic pole.

The element 17 of magnetoresistance effect is therefore magnetically isolated with the lower shield layer 5 and the common magnetic pole 11 by the first non-magnetic layer 6. On the other hand, the conductive coil 13 is therefore electrically isolated with the common magnetic pole 11 and the upper magnetic pole 12 by the first insulation layer 9a and the second insulation layer 9b.

As illustrated in FIGS. 3A and 3B, the conductive coil 13 is fabricated by a copper wire continuously wound up by n turns (for example, n=3) to form a elliptical shape. By supplying the conductive coil 13 with electric current, a magnetic field is generated in the element 17 of magnetoresistance effect. Accordingly, an information is recorded on or reproduced from a magnetic disk mounted on a magnetic disk unit. The common magnetic pole 11 is operable as both an upper shield layer for magnetically shielding the element 7 of magnetoresistance effect and a lower magnetic pole for forming a yoke where recording operation is carried out.

In this embodiment, an inductance L of the recording portion in the MR thin film magnetic head is determined by the following equation.

$$L = \frac{n^2}{\frac{g}{\mu_0 A_g} + \frac{l_c}{\mu \mu_0 A_c}}$$

where n represents number of turns of the coil 13, $\mu_0$ represents space permeability, $\mu$ represents relative permeability (ratio of permeability of yoke to the space permeability), g represents a gap length of the element 17 of magnetoresistance effect (thickness of the non-magnetic layer), Ag represents an area of opposite surfaces with a gap (the product of s and L; s is a width of the front end portion of the upper magnetic pole while L is a length of the portion in which the upper magnetic pole and the non-magnetic layer are kept in contact with each other), lc represents a length of magnetic path of the yoke, and Ac represents cross section of the yoke (an average equivalent cross section provided that the yoke has the same section through the whole thereof).

Under the above-described equation, when a size of the upper magnetic pole is constant, a relation between an area of the common magnetic pole defining the cross section of the yoke and the inductance of the recording portion can be explained with reference to FIG. 4. Namely, as depicted in FIG. 4, when the area of the common magnetic pole becomes large, the inductance of the recording portion also becomes large in proportion thereto. This relation can be affirmed, only when a film thickness of the common magnetic pole and the number of turns of the coil are kept constant.

In the compound type thin film magnetic head 20 according to this embodiment, a width E of the common magnetic pole 11 is determined to be substantially equal to a width d of the upper magnetic pole 12, as illustrated in FIG. 3B. In addition, the common magnetic pole 11 is formed to have a substantially rectangular shape, as depicted in FIG. 3B. Under the circumstances, when the common magnetic pole 11 is formed to have an area of 2800 $\mu m^2$ without deteriorating a magnetic shield effect, the inductance of the recording portion can be substantially 100 nH, as shown by the point 31 in FIG. 4. Comparative examples in the conventional compound type thin film magnetic head 10 are also illustrated in FIG. 4. Namely, in the conventional compound type thin film magnetic head 10, when the common magnetic pole was formed to have an area of about 4000 through 9000 $\mu m^2$, the inductance of the recording portion was substantially 150 through 220 nH, as shown by the point 32 through 33 in FIG. 4.

Herein, referring to FIG. 5, description is made as regards a relation between the inductance of the recording portion and the aforesaid NLTS in a compound type thin film magnetic head.

In a compound type thin film magnetic head, the NLTS is decreased in response to a decrease of the inductance of the recording portion, as shown by the curve 35 in FIG. 5. On the other hand, when the inductance of the recording portion is small, a rise-up time of a current supplied to the coil for recording information (recording current: recording signal) becomes short. As a result, a rise-up time of a magnetic field generated in a gap of the recording portion (head magnetic field) also becomes short. Thus, it is achieved that the head magnetic field is varied sensitively responsive to a change of the recording current(recording signal). The NLTS is therefore so reduced in the compound type thin film magnetic head 20 according to this embodiment. When the inductance of the recording portion is substantially 100 nH, the NLTS is reduced down to about −20 dB, as shown in FIG. 5. On the other hand, the inductance of the recording portion was substantially 200 nH in the conventional compound type thin film magnetic head 10. At that time, the NLTS was about −10 dB in the conventional compound type thin film magnetic head 10, as shown in FIG. 5.

Figure 6:
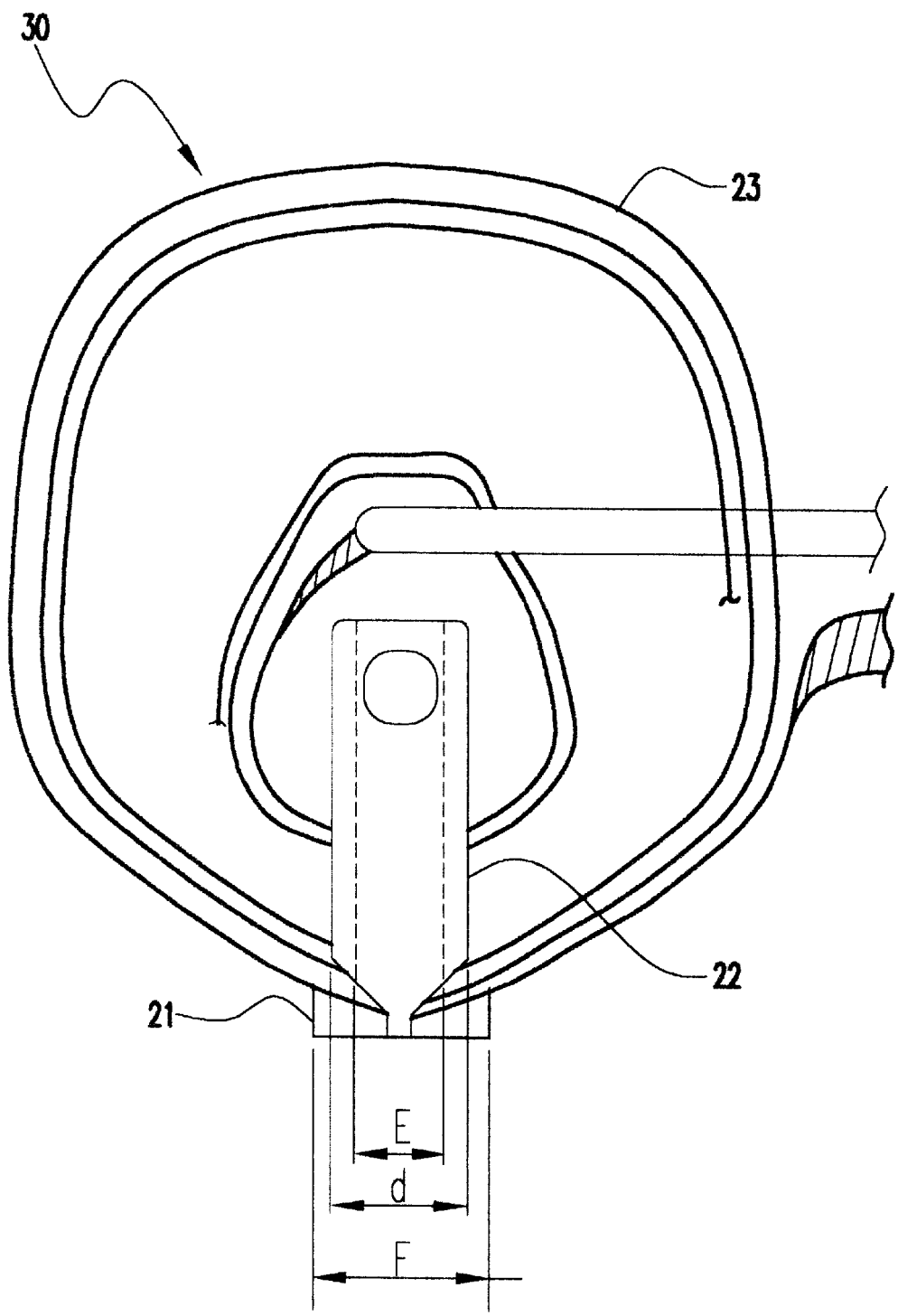
FIG. 6 is a schematic plan view for showing a compound type thin film magnetic head according to a second embodiment of the present invention.

Referring to FIG. 6, description proceeds to a compound type thin film magnetic head according to a second embodiment of the present invention.

FIG. 6 is a schematic plan view for showing a compound type thin film magnetic head according to the second embodiment.

In FIG. 6, illustrated is a compound type thin film magnetic head 30 according to the second embodiment. The compound type thin film magnetic head 30 has a structure basically similar to that of the first embodiment. Similar portions are designated by like reference numerals.

In this embodiment, only a front end portion of the common magnetic pole 21 is formed to have a large width in order that the common magnetic pole 21 may perform further magnetic shield effect. Namely, a width F of the front end portion of the common magnetic pole 21 is made larger than a width d of the upper magnetic pole 22 while a width E of the remaining portion is made substantially equal to the width d of the upper magnetic pole 22. The width F is substantially twice as large as the width E. A length of the portion defining the width F is substantially equal to a length of the element of magnetoresistance effect illustrated in FIG. 2.

With this structure, a width of a portion of the common magnetic pole 21 in which the element of magnetoresistance effect lies becomes large. A magnetic shield effect for the element of magnetoresistance effect becomes further stable. Nevertheless, the area of the common magnetic pole 21 is enlarged at the most five percentage thereof. An influence for the NLTS can be compressed enough small.

As described above, according to the compound type thin film magnetic head 20 and 30 of the first and the second embodiments of the present invention, a width of the common magnetic pole is made small, as far as the magnetic shield effect is not deteriorated. Thereby, the area of the common magnetic pole can be made enough small to decrease the inductance of the recording portion. As a result, a rise-up time of the head magnetic field becomes short. The NLTS is so reduced accordingly. This technical advantage brings meritorious effect that a recording density can be improved in a hard disk drive.

While the present invention has thus far been described in conjunction with only two embodiments thereof, it will now be readily possible for those skilled in the art to put this invention into various other manners. For example, in the first embodiment, the conductive coil 13 comprises a single layer similarly to the conductive coil 3 in the conventional compound type thin film magnetic head. However, the conductive coil may comprise not less than two layers. Namely, the conductive coil may have a multi-layer structure. In these cases, adjacent layers of the coil must be isolated with each other by each insulation layer.

What is claimed is:

1. A thin film magnetic head which is mounted on a magnetic disk unit for use in recording and reproducing information, comprising:

a substrate which is made of a non-magnetic material;

a lower shield layer which is formed on said substrate and which is made of a magnetic material;

a first non-magnetic layer which is formed on said lower shield layer;

a common magnetic pole which is formed on said first non-magnetic layer as both an upper shield layer and a lower magnetic pole, said common magnetic pole having a first area;

a second non-magnetic layer which is formed on said common magnetic pole;

a conductive coil which is formed on said second non-magnetic layer with a first insulation layer interposed therebetween, said conductive coil being overlaid by a second insulation layer;

an upper magnetic pole which is formed on said second insulation layer and which has a second area;

a yoke structure which is formed by said upper magnetic pole and said common magnetic pole, wherein a front end of said upper magnetic pole is kept in contact with said first non-magnetic layer and a rear end of said upper magnetic pole is in contact with said common magnetic pole; and an element of magnetoresistance effect provided in a front end of said first non-magnetic layer, wherein said first area of said common magnetic pole is substantially equal to or less than said second area of said upper magnetic pole.

2. A thin film magnetic head as claimed in claim 1, wherein said first area of said common magnetic pole is not larger than about 3000 $\mu m^2$.

3. A thin film magnetic head as claimed in claim 1, wherein said conductive coil comprises a single layer.

4. A thin film magnetic head as claimed in claim 1, said conductive coil having a multi-layer structure which includes at least two layers, wherein adjacent layers thereof being isolated with each other by an insulation layer.

5. A thin film magnetic head which is mounted on a magnetic disk unit for use in recording and reproducing information, comprising:

a substrate which is made of a non-magnetic material;

a lower shield layer which is formed on said substrate and which is made of a magnetic material;

a first non-magnetic layer which is formed on said lower shield layer;

a common magnetic pole which is formed on said first non-magnetic layer as both an upper shield layer and a lower magnetic pole, said common magnetic pole having a first area;

a second non-magnetic layer which is formed on said common magnetic pole;

a conductive coil which is formed on said second non-magnetic layer with a first insulation layer interposed therebetween, said conductive coil being overlaid by a second insulation layer;

an upper magnetic pole which is formed on said second insulation layer and which has a second area, said first area being substantially less than or equal to said second area;

a yoke structure which is formed by said upper magnetic pole and said common magnetic pole, wherein a front end of said upper magnetic pole is kept in contact with said first non-magnetic layer and a rear end of said upper magnetic pole is in contact with said common magnetic pole; and an element of magnetoresistance effect provided in a front end of said first non-magnetic layer, wherein said common magnetic pole includes a front end portion corresponding to said element of magnetoresistance effect and a main portion, and wherein said upper magnetic pole includes a front end portion and a main portion, said first area of said common magnetic pole including an area of said main portion and an area of said front end portion, said area of main portion of said common magnetic pole having a width not larger than a width of said main portion of said upper magnetic pole, and said area of said front end portion of said common magnetic pole having a width larger than the width of said main portion of said common magnetic pole.

6. A thin film magnetic head as claimed in claim 5, wherein said first of said common magnetic pole is not larger than about 3000 $\mu m^2$.

7. A thin film magnetic head as claimed in claim 5, wherein said conductive coil comprises a single layer.

8. A thin film magnetic head as claimed in claim 5, said conductive coil having a multi-layer structure which includes at least two layers, wherein adjacent layers thereof being isolated with each other by an insulation layer.

* * * * *